INVENTORS.
JOSEPH STEPHEN BRUGLER
WILLIAM H. WOODWORTH
BY
V. C. MULLER
ATTORNEY.

INVENTORS.
JOSEPH STEPHEN BRUGLER
WILLIAM H. WOODWORTH
*BY*
V. C. MULLER
ATTORNEY.

United States Patent Office 3,373,363
Patented Mar. 12, 1968

3,373,363
DISCRIMINATOR CIRCUIT RESPONSIVE TO A PULSE POSITION RELATIVE TO A GATE PERIOD

Joseph S. Brugler and William H. Woodworth, China Lake, Calif., assignors to the United States of America as represented by the Secretary of the Navy Filed Sept. 15, 1965, Ser. No. 487,635
3 Claims. (Cl. 328—109)

ABSTRACT OF THE DISCLOSURE

The invention is a discriminator circuit which is linearly responsive to a video position within a gate. It consists of two parallel processing channels. The gate pulse is applied to both processing channels, with the pulse applied to one of the channels of positive polarity and the pulse applied to the other of the channels of negative polarity. In each channel the pulse is applied to an integrator circuit which produce ascending and descending ramps, respectively. The video signal is superimposed on both of these ramps. The superimposed video signal and ramp signals are applied to a so-called "sample and hold" circuit in each channel. The sample and hold circuit is of a type producing an exponentially declining potential from across a capacitor charged by its input. The outputs of the sample and hold circuits are summed by a common summing network and the summer output is passed through a "dead-band" diode network including parallel diodes, but oppositely poled.

The invention described herein may be manufactured and used by or for the Government of the United States of America for governmental purposes without the payment of any royalties thereon or therefor.

This invention relates to a discriminator circuit for use in target tracking systems of the type responsive to input pulse signals, and which discriminator circuit provides an error signal which is linearly related to the input pulse position relative to a synchronously timed square wave gate signal.

An object of this invention is to provide a discriminator circuit, of the type referred to, employing circuit construction principles that inherently provide an accurately linear transfer characteristic.

Another object is to provide a discriminator circuit in accordance with the preceding objective which positively provides a "dead band" of low output at the center of the circuit's input-output transfer characteristic curve.

Other objects and many of the attendant advantages of this invention will be readily appreciated as the same becomes better understood by reference to the following detailed description when considered in connection with the accompanying drawings wherein.

Figures 1, 3:
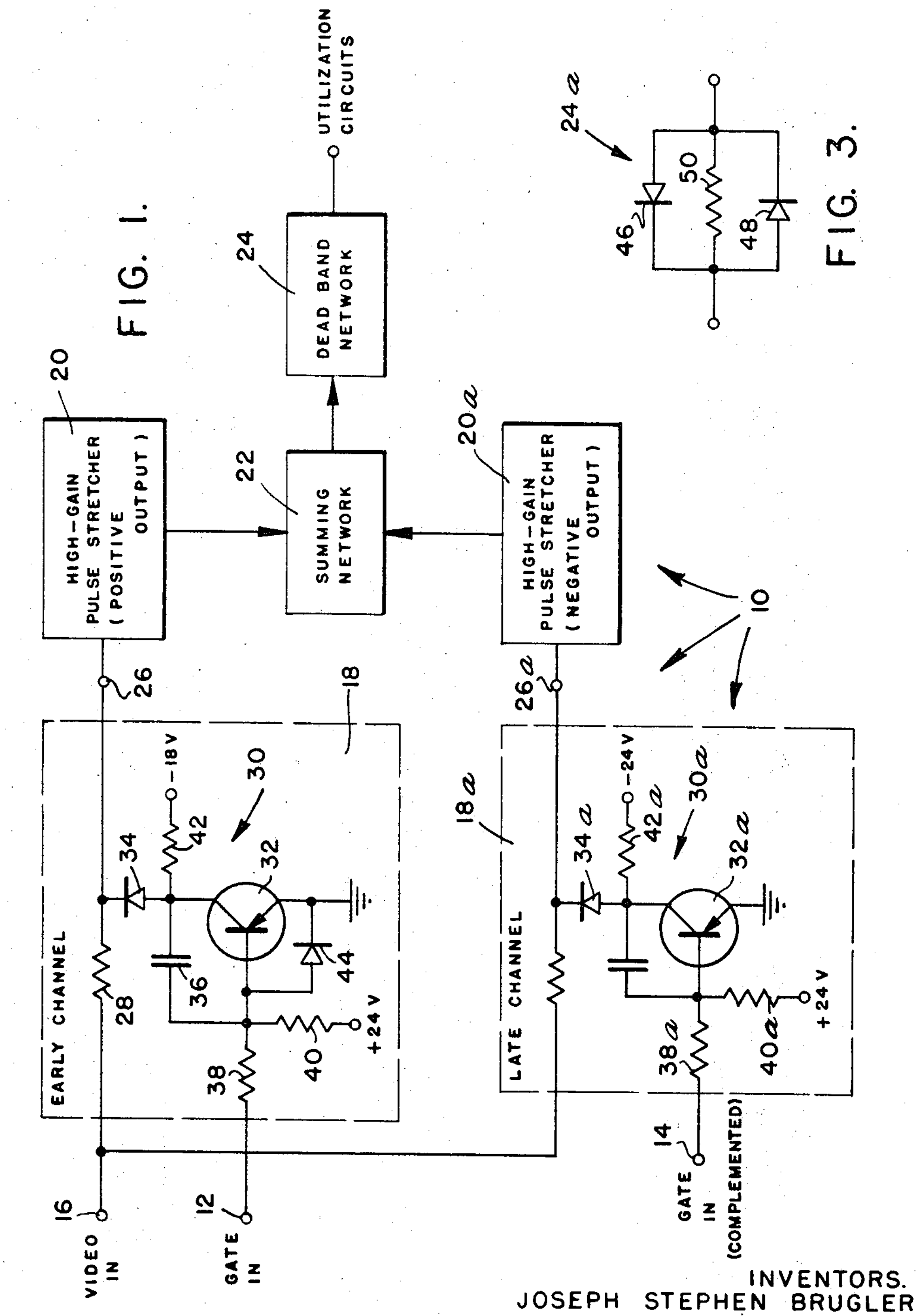
FIG. 1 is an electrical schematic of a circuit in accordance with the present invention.
FIG. 3 is a circuit diagram of the dead band network, indicated by block in FIG. 1.

Referring now to the drawing and in particular to FIG. 1, a discriminator circuit 10 is used in connection with automatic tracking systems of the type in which a pulse occurs at any of various times within the duration of a synchronously timed "unblanking" gate signal consisting of a square wave. The output of circuit 10 is an error signal that varies in accordance with the difference in time between the occurrence of the pulse and middle of the period of the square wave gate signal. One such system is the Television Target Tracking System disclosed in the copending patent application of Jack A. Crawford et al., Ser. No. 224,594, filed Sept. 12, 1962. In that system there are two automatic feedback control type tracking channels, for tracking in the horizontal and vertical directions, respectively, relative to a conventional television raster. For simplicity, the present description will be limited to the horizontal channel, it being understood that the same principles are applicable to the vertical tracking channel. The present circuit 10 may be substituted in place of the horizontal coincidence gates (reference numerals 56, 58 therein), the summing network (57, therein), and the saturable reactor (59, therein). The unblanking period in that television tracking system consists of the consecutively combined periods of the left and right gate pulse multivibrators (40 and 42, therein). However, it should be noted that the need for forming the unblanking period as a combination of two consecutive half periods has been obviated by the present invention. Accordingly, incorporation of the present invention into that system may also be accompanied by a simplification in the circuitry for defining the gate periods, whereby a single multivibrator rather than two multivibrators produce each gate period. A negative going form of the square wave, which is equal in duration to the unblanking period, is applied to a first gate signal input terminal 12 of circuit 10. This negative going form of signal consists of a signal which is at ground potential except during the "unblanking" or open gate period. Another signal, which is a complementary form of the latter signal is applied to a second gate signal input terminal 14. This complementary form of signal consists of a positive going signal which is at a negative potential except during open gate portions of the signal, when it rises to ground potential. In the system disclosed in the cited copending application, the pulse signal to which the discriminator circuit is to respond consists of the differentiated and rectified video pulse wave signal of negative polarity from the television camera, and this signal is applied to a video signal input terminal 16. When the tracking system is aimed at the edge of a target in the image of the television camera, a video pulse representing the light-tone contrast at the edge of the target image is prominent in the video pulse wave signal coinciding with the pulse gate signal. The rectifier circuit which feeds the pulse signal to terminal 16 is preferably of the type disclosed in the application of Joseph Stephen Brugler, entitled "A Target Pulse Enhancer and Automatic Gain Control Circuit for use in the Automatic Tracking System," Ser. No. 487,637, filed Sept. 15, 1965. The circuit disclosed in that copending application gates the incoming video signal wave, so that only the unblanked portion of the video pulse wave, or pulse train wave, is applied to terminal 16. Circuit 10 comprises first and second parallel signal channels. The first channel, hereinafter called the "Early Channel" as indicated by legend on the drawing, consists of serially connected pulse peak clamping network 18, and high gain pulse stretcher circuit 20. The second channel, correspondingly called the "Late Channel," consists of serially connected pulse peak clamping network 18*a* and high gain pulse stretcher circuit 20*a*. These channels are called the early and late channels, because an output representing a pulse which occurs in the first or early half of the gate period is developed by the former channel, and an output representing a pulse which occurs in the last half of the gate period is developed by the latter channel. Pulse stretcher circuit 20 of the early channel is adapted to provide a positive polarity output, and pulse stretcher circuit 20*a* of the late channel is adapted to provide a negative polarity output. The outputs of these pulse stretching circuits are applied as separate inputs to a summing circuit 22. However, since the pulse stretcher outputs are of opposite polarity, the effective circuit action of the summing circuit is to differentially combine the outputs of early and late channels. The output of summing circuit 22 is preferably passed through a dead band circuit 24, which provides a small so-called "dead band region" of the circuit's input-output transfer characteristic curve 25, FIG. 2. The discriminator provides a low output in this dead band region, which extends for a slight distance in both directions away from the center of the transfer curve, where the null point in the discriminator's output occurs. Dead band circuit 24 serves to prevent deleterious effects found to occur in high gain tracking systems due to spurious noise in this region of the discriminator's input-output characteristic curve.

Within the pulse peak clamping network 18 of the early channel, the video signal from terminal 16 is coupled to a clamping network terminal 26 through a resistor 28. Network 18 further comprises a conventional Miller type integrator circuit 30, including an integrator transistor 32, and a clamping diode 34 connected between the output terminal 26 and the collector of the integrator transistor. The clamping diode 34 is poled with its cathode connected to terminal 26 and its anode to the collector of transistor 32. A feedback or integration capacitor 36 is connected between the transistor's collector and base electrodes. The negative going form of a square wave gate signal, present at terminal 12, is coupled to the base electrode of transistor 32 through a resistor 38 of predetermined value. The base electrode is also connected to a positive voltage source through another resistor 40 of predetermined value. The collector of transistor 32 is coupled to a negative source through a collector resistor 42. Resistors 38 and 40 form a voltage divider network which applies a cut-off bias to the base of transistor 32 when the gate signal is in its zero potential, or closed gate condition, and which applies a forward bias to the base when the gate signal is in its negative potential, or open gate condition. The forward bias applied to the transistor base during the open gate portion of the signal is sufficient to drive the transistor into conduction. The potential at the transistor collector is equal to the voltage of the collector bias source during the closed gate portion of the gate signal, except for a short initial period upon the gate signal's return to a zero potential, which is not significant in the operation of the circuit. When the negative going gate pulse appears at terminal 12, transistor 32 conducts and the potential at its collector commences to rise. The parameters of circuit 30 are conventionally chosen to cause the potential at the collector electrode to follow a desired ramp signal waveshape. This waveshape consists of a linear positive going excursion in which it reaches the zero potential at the end of the period of the square wave gate signal. Thus, integrator circuit 32 generates a positively sloped ramp voltage waveform in a timed relationship coinciding with the period of the square wave gate signal. A diode 44 is connected between the base and emitter of transistor 32 to prevent a large positive build-up of voltage at the base of transistor 32 during the closed-gate period. Diode 44 is poled with its anode and cathode connected to the base and emitter, respectively. The high gain pulse stretcher circuit 20*a* of the early channel is essentially the same as the high gain transistor pulse stretcher disclosed in the hereinabove cited concurrently filed application for a Target Pulse Enhancer and Automatic Gain Control Circuit.

The pulse peak clamping network 18*a* of the late channel is like network 18 except that its integrator circuit 30*a* is adapted to produce a negatively sloped ramp voltage waveform which is the complement of that produced by network 18. This negatively sloped waveform is produced in response to the positive going form of square wave gate signal at terminal 14. A bias network associated with the base of integrator transistor 32*a*, and similar to that in the early channel, maintains the base forward biased during the closed gate portions of the gate signal, and reverses the base drive of the transistor during the opened gate portions of the signal. Pulse stretcher circuit 20*a* is like circuit 20, except that it is modified to produce a negative polarity output. The modification consists of reversal of the positions of the diode and the charging capacitor in its capacitor charging circuit, and by use of PNP type transistors in its output buffer stage.

Referring now to FIG. 3, a specific circuit 24*a* is illustrative of dead band circuit 24, FIG. 1. Circuit 24*a* comprises two oppositely poled diodes 46 and 48, and a relatively large resistor 50, all connected in parallel. This parallel circuit is connected in series with the output of summing circuit 24. In instances in which the output level from the summing circuit is below the contact potentials of the diodes, the diodes present high impedances and the large resistor 50 is effectively in series with the output of the summing circuit. This in turn causes the error signal to be very small. When the output of the summing circuit exceeds the diode's turn-on potential the signal bypasses resistor 50 through one or the other of the diodes.

Figures 2, 4, 5:
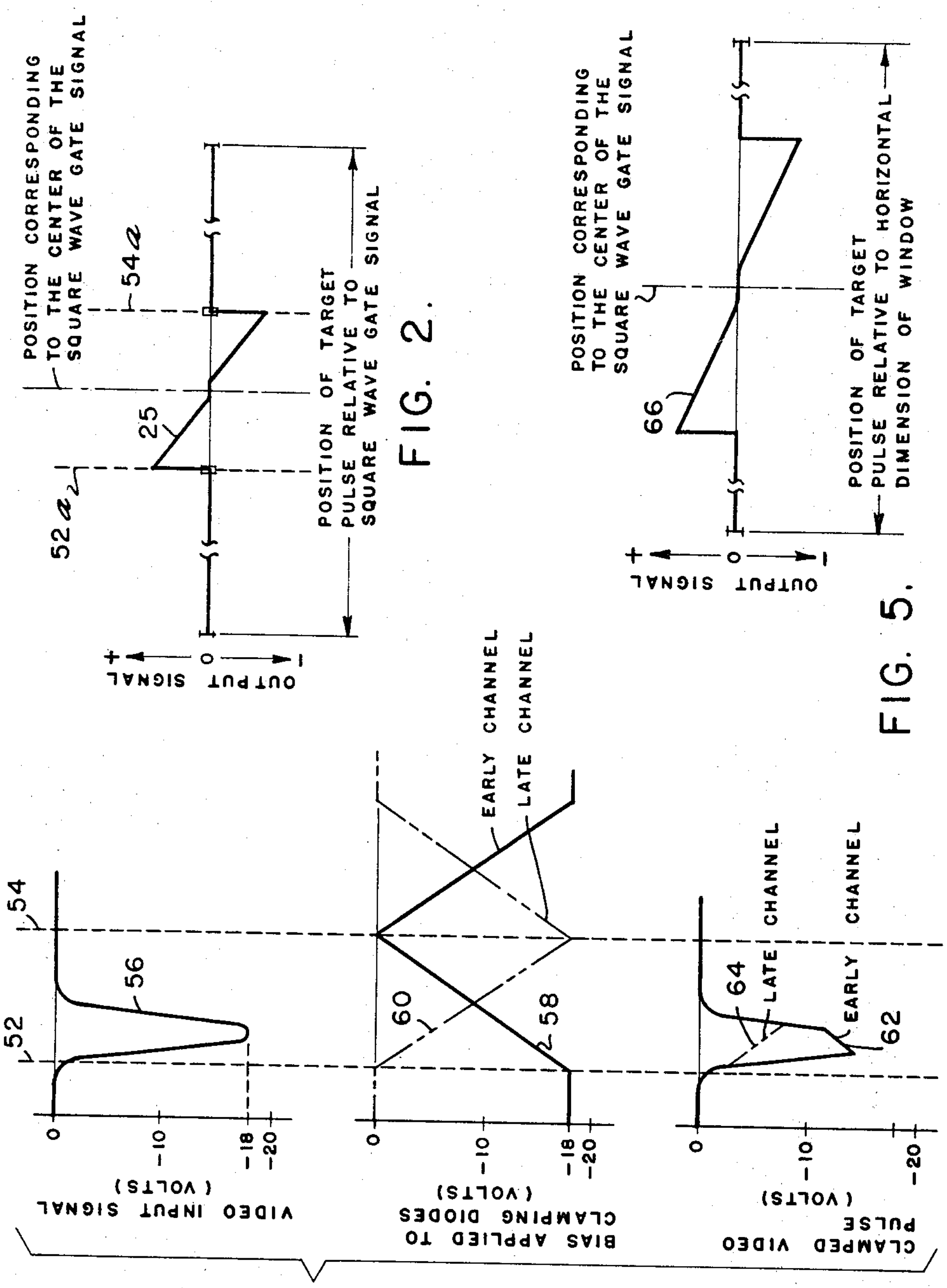
FIG. 2 is a graph illustrating the input-output transfer characteristic of the circuit of FIG. 1.
FIG. 4 is a waveform timing diagram, showing various waveforms at certain points in the circuit of FIG. 1.

A better understanding of the operation of circuit 10 may be had from study of FIG. 4, which shows a waveform timing diagram for certain circuit points in networks 18 and 18*a*. These waveforms are for times generally coinciding with the "open gate" portions of the signals at terminals 12 and 14. Vertical dashed lines 52 and 54 indicate the beginning and end of the open gate period, respectively. The upper waveform 56 in the uppermost graph in the voltage at input terminal 16; the solid line waveform 58 in the middle graph is the voltage at the anode of diode 34; the broken line waveform 60 in the middle graph is the voltage at the anode of diode 34*a*; the full line waveform 62 in the lowermost graph is the voltage at terminal 26; and the broken line waveform 64 in the lowermost graph is the voltage at terminal 26*a*.

Operation of clamping network 18 of the early channel will be first described. Assume that waveform 56 represents a pulse target signal in connection with the operation of the television tracking system of the cited copending application and that the target pulse occurs early in the gate period shown. The positively sloped ramp waveform 58, which is generated by integrator circuit 30, and which is of negative polarity, is applied to the input video pulse to be effective to clamp waveform 62, as shown. The differential action of pulse stretching circuits 20 and 20*a* and summing circuit 22 provides an output in accordance with the difference between the amplitudes of the clipped pulse shaped waveforms 62 and 64. It will be appreciated that if a given pulse were to occur at later and later times in the period between vertical lines 52 and 54, then network 18 would clamp it to lower and lower amplitudes, and network 18*a* would clamp it to higher and higher levels. The combined effects of the pair of opposed output polarity pulse stretchers 20 and 20*a*, and summing network 24, are to differentially combine the amplitudes of the clamped pulses from networks 18 and 18*a*. It will be appreciated that the effect of differentially combining the output from the pairs of channels for different pulse positions within the gate interval, is to produce the idealized (for an infinitely thin target pulse) transfer curve 25, FIG. 2. It is to be noted that the portions of waveforms 58 and 60 occurring after the end of the open gate period, i.e. beyond vertical dashed line 54, FIG. 4, have no effect in the output of the circuit as the result of this differential action.

An important feature of the invention is that the mode of operation of driving the variable level clamping channels by positive and negative sloped ramp signals inherently provides an accurately linear transfer characteristic. Also, dead band circuit 24 positively prevents occurrence of any noise interference effects in the region of the characteristic curve at the null point of the error signal. These features are particularly important in the television tracking system disclosed in the hereinabove cited copending application. That system, which has very high gain, has been found to be extremely sensitive to non-linearities in the system. Also the system's response characteristics were found to be particularly sensitive to the presence of spurious noise while closely tracking a target and therefore operating near the hull point of its error generators transfer curve. Accordingly non-linearities in its response characteristics and spurious noises can cause "hunting" type oscillation in system operation, which have a deleterious effect on its tracking capability. This type of oscillation is sometimes called "limit-cycle" oscillation.

There is still another important feature of the invention when it is used in the above referenced television tracking system. Circuit 10 inherently provides stable tracking for different size targets, including targets which are larger than the window gate of the system. This is diagrammatically shown by curve 66 of FIG. 5, which is a graph showing the error curve obtained for a target which is twice as wide as the window period. It can be seen that the slope of the curve is less than curve 25, meaning reduced tracking loop gain and higher loop stability. In the general contrast tracking situation, targets are neither isolated points nor as large as twice the window width. In these cases the discriminator curve slope lies between that of curves 25 and 66, and well-behaved tracking is assured.

While circuit 10, as disclosed hereinabove, requires that the video input applied to terminal 16 be "pre-gated," it will be recognized that the circuit could be modified to inherently provide gating by adapting the clamping voltages applied to the anodes of clamping diodes 34 and 34*a*, to be at zero potential except during the open gate intervals.

The following list of components is included by way of example of the type and values of circuit components in a specific embodiment of circuit 10, which was employed in a television tracking system essentially like that disclosed in the previously cited copending application. In that system the duration of the open gate periods of the signals applied to terminals 12 and 14 is 2.6 microseconds, and the pulse width of a typical target pulse applied to terminal 16 is nominally 0.5 microsecond. The negative going square wave gate applied to terminal 12 is at ground potential except during the open gate period when it drops to −9 volts. The positive going square wave gate signal applied to terminal 14 is at −6 volts except during the open gate period when it rises to ground potential. A typical peak value of a target pulse applied to terminal 12 is −20 volts relative to ground level.

| Component | Numeral | Type or Value |
|---|---|---|
| Resistors | 28, 28a, 38a | 2.0K ohm. |
| Transistors | 32, 32a | FSP 93 Silicon type. |
| Diodes | 34, 34a, 44 | IN270 Germanium type. |
| Capacitors | 36, 36a | 20 picofarad. |
| Resistor | 38, 42, 42a | 3.9K ohm. |
| Do | 40 | 39.0K ohm. |
| Do | 40a | 16.0K ohm. |
| Diodes | 46, 48 | HD4021 Silicon type. |
| Resistor | 50 | 10.0K ohm. |

Obviously many modifications and variations of the present invention are possible in the light of the above teachings. It is therefore to be understood that within the scope of the pending claims the invention may be practiced otherwise than as specifically described.

What is claimed is:

1. A discriminator circuit responsive to the position of a pulse relative to the middle of a square waveform signal, said discriminator circuit receiving as the input thereof a first input signal consisting of a square wave signal, and a second input signal consisting of a pulse signal occurring at any of the various times during the duration of the square wave signal, said discriminator circuit producing an error signal corresponding to the time relationship between the pulse signal of the second input signal and a reference time corresponding to one-half of the duration of the square wave of the first input signal, said discriminator circuit comprising;

(a) a parallel pair of signal processing channels consisting of first and second pulse peak clamping channels adapted to each simultaneously receive the first input pulse signal, said clamping channels each having an input side and an output side and a variably biased diode clamping network shunt connected to signal ground therebetween, (b) first and second ramp signal generating means for biasing the shunt connected variably biased diode clamping networks of one and the other of the pulse peak clamping channels with first and second linear ramp signals having complementary positive and negative slopes, respectively, said first and second ramp signal generating means adapted to produce said linear ramp signals in a timed relationship coinciding with the duration of said square wave signal, and (c) means for differentially combining the signals at outputs of the pair of clamping network to produce said error signal.

2. A discriminator circuit in accordance with claim 1, said discriminator circuit receiving a third input signal consisting of another square wave signal which is the complement, in amplitude waveform, of the first square wave gate signal, (d) said first and second ramp signal generators comprising a pair of integrator circuits for integrating said first and third signals, respectively.

3. A discriminator circuit in accordance with claim 2, and further of a type for use as an error signal generator in a sampled data, automatic feedback control system responsive to a fourth input signal consisting of a periodic video pulse train wave which inclues the pulse signal of the second input signal as a portion thereof, in which control system the square wave signal of the first input signal occurs in substantially synchronously timed relationship to the periodic video pulse train wave of the fourth input signal and serves as the unblanking signal to define said first input signal, said fourth input signal being adapted to be blanked out, except for the duration of the square wave of the first input signal, and (e) the signals at the outputs of the first and second pulse peak clamping channels being coupled to the inputs of the means for differentially combining the signals through first and second high gain pulse stretcher circuits, respectively.

References Cited

UNITED STATES PATENTS

| | | | |
|---|---|---|---|
| 2,514,369 | 7/1950 | Buehler | 328—109 |
| 3,054,062 | 9/1962 | Vomarburg | 328—133 |
| 3,205,438 | 9/1965 | Buck | 328—133 |

ARTHUR GAUSS, *Primary Examiner.*

ROY LAKE, *Examiner.*

R. E. BERGER, *Assistant Examiner.*